(12) United States Patent
Mezhibovsky et al.

(10) Patent No.: US 10,289,982 B2
(45) Date of Patent: May 14, 2019

(54) CONTEXT AWARE INTERACTION

(71) Applicant: GENESYS TELECOMMUNICATIONS LABORATORIES, INC., Daly City, CA (US)

(72) Inventors: Vladimir Mezhibovsky, San Francisco, CA (US); Nikolay Korolev, Concord, CA (US); Herbert Willi Artur Ristock, Walnut Creek, CA (US)

( * ) Notice: Subject to any disclaimer, the term of this patent is extended or adjusted under 35 U.S.C. 154(b) by 0 days.

(21) Appl. No.: 15/901,784

(22) Filed: Feb. 21, 2018

(65) Prior Publication Data
US 2018/0181921 A1 Jun. 28, 2018

Related U.S. Application Data

(63) Continuation of application No. 15/435,279, filed on Feb. 16, 2017, now Pat. No. 9,934,491, which is a
(Continued)

(51) Int. Cl.
*G06F 15/16* (2006.01)
*G06Q 10/10* (2012.01)
(Continued)

(52) U.S. Cl.
CPC ......... *G06Q 10/1095* (2013.01); *G06Q 10/00* (2013.01); *G06Q 10/06314* (2013.01); *G06Q 10/1093* (2013.01); *H04L 51/046* (2013.01); *H04L 51/20* (2013.01); *H04L 65/4007* (2013.01); *H04L 67/18* (2013.01); *H04L 67/10* (2013.01)

(58) Field of Classification Search
CPC ............... G06Q 10/1095; G06Q 10/00; G06Q 10/06314; G06Q 10/1093; H04L 51/046; H04L 51/20; H04L 65/4007; H04L 67/18; H04L 67/10
USPC ......................................... 709/204
See application file for complete search history.

(56) References Cited

U.S. PATENT DOCUMENTS

| 5,812,652 A | 9/1998 | Jodoin et al. |
| 6,529,500 B1 | 3/2003 | Pandharipande |

(Continued)

FOREIGN PATENT DOCUMENTS

| CA | 2839011 A1 | 12/2012 |
| EP | 2721512 A2 | 3/2015 |
| WO | 2012174003 A2 | 12/2012 |

OTHER PUBLICATIONS

Canadian Intellectual Property Office action for Application No. 2,839,011, dated Apr. 26, 2016, 3 pages.
(Continued)

*Primary Examiner* — Melvin H Pollack

(57) ABSTRACT

A network-connected server for meeting initiation has software executing on the server from a non-transitory physical medium, the software providing a function allowing a user to schedule a meeting and to configure availability conditions, a function for informing scheduled participants of the scheduled meeting, a function for receiving indications of availability for the scheduled meeting from communication appliances associated with scheduled participants, and a function for connecting the communication appliances to communicate when the configured availability conditions are met.

18 Claims, 5 Drawing Sheets

Related U.S. Application Data continuation of application No. 14/881,127, filed on Oct. 12, 2015, now Pat. No. 9,578,071, which is a continuation of application No. 13/159,885, filed on Jun. 14, 2011, now Pat. No. 9,159,037.

(51) Int. Cl.
*G06Q 10/00* (2012.01)
*G06Q 10/06* (2012.01)
*H04L 12/58* (2006.01)
*H04L 29/06* (2006.01)
*H04L 29/08* (2006.01)

(56) References Cited

U.S. PATENT DOCUMENTS

| | | | |
|---|---|---|---|
| 6,879,678 B1 | 4/2005 | Lang | |
| 7,317,716 B1 | 1/2008 | Boni et al. | |
| 7,409,048 B2 | 8/2008 | Trandal et al. | |
| 7,441,247 B2 | 10/2008 | Peruta | |
| 7,472,352 B2 | 12/2008 | Liversidge et al. | |
| 7,657,632 B2 | 2/2010 | Nakao et al. | |
| 7,676,550 B1 | 3/2010 | Jachner | |
| 7,787,609 B1 | 8/2010 | Flockhart et al. | |
| 7,813,488 B2 * | 10/2010 | Kozdon | G07C 9/00158 |
| | | | 379/201.04 |
| 7,835,344 B1 | 11/2010 | Bartholomew et al. | |
| 7,840,210 B2 | 11/2010 | May | |
| 7,870,215 B1 | 1/2011 | Groves et al. | |
| 7,886,001 B2 * | 2/2011 | Asthana | G06Q 10/10 |
| | | | 709/204 |
| 7,925,688 B2 | 4/2011 | Mampaey et al. | |
| 7,958,457 B1 * | 6/2011 | Brandenberg | G06F 1/1613 |
| | | | 715/789 |
| 7,991,636 B1 | 8/2011 | Groves | |
| 7,992,089 B2 | 8/2011 | Murray et al. | |
| 8,069,166 B2 | 11/2011 | Alvarado et al. | |
| 8,103,958 B2 | 1/2012 | Bank et al. | |
| 8,112,100 B2 | 2/2012 | Frank et al. | |
| 8,121,953 B1 * | 2/2012 | Orttung | G06Q 10/1095 |
| | | | 705/35 |
| 8,150,718 B2 * | 4/2012 | Olliphant | G06Q 10/06314 |
| | | | 705/7.18 |
| 8,160,223 B2 | 4/2012 | Bennett et al. | |
| RE43,436 E * | 5/2012 | Teven | G06Q 10/10 |
| | | | 709/206 |
| 8,204,938 B2 | 6/2012 | Digate et al. | |
| 8,214,504 B2 | 7/2012 | Di Giglio et al. | |
| 8,250,141 B2 | 8/2012 | Xiao et al. | |
| 8,286,183 B2 | 10/2012 | Baird et al. | |
| 8,295,206 B2 | 10/2012 | John et al. | |
| 8,295,465 B2 | 10/2012 | Altberg et al. | |
| 8,296,374 B2 | 10/2012 | Korenshtein | |
| 8,300,789 B2 | 10/2012 | Shah et al. | |
| 8,311,197 B2 * | 11/2012 | Shaffer | H04L 12/1813 |
| | | | 379/159 |
| 8,316,104 B2 * | 11/2012 | Galvez | C07K 16/286 |
| | | | 709/219 |
| 8,320,365 B2 | 11/2012 | Weintraub et al. | |
| 8,351,898 B2 | 1/2013 | Raleigh | |
| 8,370,432 B2 | 2/2013 | Digate et al. | |
| 8,375,092 B2 | 2/2013 | Digate et al. | |
| 8,392,498 B2 | 3/2013 | Berg et al. | |
| 8,411,668 B1 * | 4/2013 | Croak | H04L 12/66 |
| | | | 370/231 |
| 8,473,386 B2 * | 6/2013 | Altberg | G06Q 20/102 |
| | | | 705/1.1 |
| 8,473,559 B2 * | 6/2013 | Das | G06Q 10/109 |
| | | | 709/204 |
| 8,503,643 B2 | 8/2013 | McKee et al. | |
| 8,521,222 B2 | 8/2013 | Erceg et al. | |
| 8,528,050 B2 | 9/2013 | Kashima et al. | |
| 8,554,828 B2 | 10/2013 | Whynot et al. | |
| 8,560,487 B2 | 10/2013 | Jhoney et al. | |
| 8,577,016 B1 * | 11/2013 | Duva | G06Q 10/00 |
| | | | 379/201.01 |
| 8,667,062 B2 * | 3/2014 | Aad | H04L 9/008 |
| | | | 709/204 |
| 8,671,154 B2 * | 3/2014 | Davis | H04L 29/12028 |
| | | | 709/204 |
| 8,676,625 B2 | 3/2014 | Nishikawa et al. | |
| 8,732,303 B2 | 5/2014 | Lopez Nieto et al. | |
| 8,792,419 B2 | 7/2014 | Wohlert et al. | |
| 8,806,356 B2 | 8/2014 | McCormack et al. | |
| 8,812,598 B2 | 8/2014 | Gaudin | |
| 8,819,129 B1 * | 8/2014 | Cyriac | H04L 65/1046 |
| | | | 709/204 |
| 8,837,696 B2 * | 9/2014 | Meriaz | H04M 3/42 |
| | | | 370/352 |
| 8,849,685 B2 * | 9/2014 | Oden | G06Q 10/063 |
| | | | 705/7.11 |
| 9,159,037 B2 | 10/2015 | Mezhibovsky et al. | |
| 9,183,560 B2 * | 11/2015 | Abelow | G06Q 10/067 |
| 9,319,523 B2 * | 4/2016 | Kirchhoff | H04M 3/5158 |
| 9,407,759 B2 | 8/2016 | Claudatos et al. | |
| 9,425,990 B2 | 8/2016 | Sakai | |
| 9,542,076 B1 * | 1/2017 | Onyon | H04L 67/306 |
| 9,574,671 B1 * | 2/2017 | Amberg | H04W 64/00 |
| 9,686,732 B2 | 6/2017 | Russell et al. | |
| 9,716,963 B2 | 7/2017 | Brisebois et al. | |
| 2007/0121867 A1 | 5/2007 | Ozugur et al. | |
| 2007/0130260 A1 | 6/2007 | Weintraub et al. | |
| 2007/0150941 A1 | 6/2007 | Jachner | |
| 2007/0277113 A1 | 11/2007 | Agrawal et al. | |
| 2007/0285504 A1 | 12/2007 | Hesse | |
| 2007/0291108 A1 | 12/2007 | Huber et al. | |
| 2008/0112337 A1 | 5/2008 | Shaffer et al. | |
| 2008/0177857 A1 | 7/2008 | Chakra et al. | |
| 2008/0255989 A1 | 10/2008 | Altberg et al. | |
| 2009/0037582 A1 | 2/2009 | Morris | |
| 2009/0094088 A1 | 4/2009 | Chen et al. | |
| 2009/0147772 A1 | 6/2009 | Rao et al. | |
| 2009/0157414 A1 | 6/2009 | O'Sullivan et al. | |
| 2009/0210491 A1 | 8/2009 | Thakkar et al. | |
| 2009/0222519 A1 | 9/2009 | Boyd | |
| 2009/0271716 A1 | 10/2009 | Jones et al. | |
| 2009/0285380 A1 | 11/2009 | Chen et al. | |
| 2009/0292769 A1 | 11/2009 | Matsuzawa | |
| 2009/0307045 A1 | 12/2009 | Chakra et al. | |
| 2010/0020728 A1 | 1/2010 | Jefferson et al. | |
| 2010/0121665 A1 | 5/2010 | Boyer | |
| 2010/0158238 A1 * | 6/2010 | Saushkin | G06Q 10/06 |
| | | | 379/265.12 |
| 2010/0184416 A1 * | 7/2010 | Gupta | G06Q 10/10 |
| | | | 455/414.3 |
| 2010/0246785 A1 | 9/2010 | Wang et al. | |
| 2010/0293029 A1 | 11/2010 | Olliphant | |
| 2010/0325207 A1 | 12/2010 | Churchill et al. | |
| 2010/0325214 A1 | 12/2010 | Gupta | |
| 2011/0015961 A1 | 1/2011 | Chan | |
| 2011/0047471 A1 * | 2/2011 | Lord | G06Q 10/10 |
| | | | 715/739 |
| 2011/0093548 A1 | 4/2011 | Das et al. | |
| 2011/0246668 A1 | 10/2011 | Mohler | |
| 2011/0249658 A1 * | 10/2011 | Wohlert | H04W 4/04 |
| | | | 370/338 |
| 2011/0276396 A1 | 11/2011 | Rathod | |
| 2012/0011205 A1 | 1/2012 | Paulsami et al. | |
| 2012/0022909 A1 | 1/2012 | Ayatollahi et al. | |
| 2012/0077493 A1 * | 3/2012 | Robbins | H04W 4/021 |
| | | | 455/435.1 |
| 2012/0150789 A1 * | 6/2012 | Jhoney | G06Q 10/06311 |
| | | | 706/52 |
| 2012/0166242 A1 * | 6/2012 | Bentley | G06Q 10/06311 |
| | | | 705/7.13 |
| 2012/0215845 A1 | 8/2012 | Aad et al. | |
| 2012/0278408 A1 | 11/2012 | Seferian et al. | |
| 2012/0284291 A1 | 11/2012 | Brown et al. | |
| 2012/0284637 A1 | 11/2012 | Boyer et al. | |
| 2012/0311014 A1 | 12/2012 | Jindal et al. | |
| 2012/0321058 A1 | 12/2012 | Eng et al. | |

(56) References Cited

U.S. PATENT DOCUMENTS

| | | | |
|---|---|---|---|
| 2012/0323997 A1* | 12/2012 | Mezhibovsky | G06Q 10/00 709/204 |
| 2013/0238708 A1 | 9/2013 | Bustamente | |
| 2013/0311571 A1* | 11/2013 | Gisby | H04M 3/563 709/204 |
| 2016/0036874 A1 | 2/2016 | Mezhibovsky et al. | |
| 2016/0255161 A1 | 9/2016 | Lim et al. | |
| 2017/0078922 A1 | 3/2017 | Raleigh et al. | |
| 2017/0099357 A1 | 4/2017 | Haupt et al. | |

OTHER PUBLICATIONS

Canadian Intellectual Property Office action for Application No. 2,839,011, dated Mar. 7, 2017, 3 pages.

Canadian Intellectual Property Office Action for Application No. 2,839,011, dated May 20, 2015, 3 pages.

Chiu, D.K.W. et al. "Constraint-Based Negotiation in a Multi-Agent Information System with Multiple Platform Support," Proceedings of the 3ih Annual Hawaii International Conference on System Sciences, Jan. 2004, 10 pages.

Crawford, Elizabeth et al., "Learning to Select Negotiation Strategies in Multi-Agent Meeting Scheduling," Progress in Artificial Intelligence, Lecture Notes in Computer Science, vol. 3808, 2005, 12 pages.

Crawford, Elizabeth et al., "Opportunities for Learning in Multi-Agent Meeting Scheduling," American Association for Artificial Intelligence, 2004, 7 pages.

European Office Action for Application No. 12799920.9, dated Mar. 29, 2016, 7 pages.

European Search Report for Application No. 12799920.9, dated Jan. 29, 2015, 7 pages.

International Search Report and Written Opinion for PCT/US2012/042072, dated Feb. 15, 2013, 10 pages.

Sen, Sandip, "Developing an Automated Distributed Meeting Scheduler," IEEE Expert, vol. 12, Issue 4, Jul.-Aug. 1997, 5 pages.

Canadian Intellectual Property Office Action for Application No. 2,839,011, dated Feb. 20, 2018, 3 pages.

* cited by examiner

CONTEXT AWARE INTERACTION

CROSS-REFERENCE TO RELATED APPLICATIONS

This application is a continuation of U.S. patent application Ser. No. 15/435,279, filed Feb. 16, 2017, which is a continuation of Ser. No. 14/881,127, filed on Oct. 12, 2015, now U.S. Pat. No. 9,578,071, which is a continuation of U.S. patent application Ser. No. 13/159,885, filed on Jun. 14, 2011, now U.S. Pat. No. 9,159,037, the content of all of which are incorporated herein by reference.

BACKGROUND OF THE INVENTION

1. Field of the Invention

The present invention is in the field of telephony communications and pertains more particularly to methods and apparatus for negotiating mutual dynamic availability between communications devices connected to a network.

2. Discussion of the State of the Art

In the art of telephony communications, much has been accomplished in connection-establishment technologies using digital shared bandwidth and digital network channels. Presence-based communications networks have been established that enable a subscriber to see if another subscriber is generally busy or available for communication. One example of such presence-based communications is the well-known "I Seek You" (ICQ) network. In general presence-based scenarios, a central server handles generally peer-to-peer connections established between communications appliances based on available presence if real-time communication is desired.

In a general sense, all presence-based protocols that allow voice/video communications use a presence status channel such as Instant Message or a Chat, or posted availability status (available/away/busy, etc.) to determine if there is availability for a conversation to occur between the two parties over a network channel.

One problem with known presence protocol functionality is that conversation context gathering is not formalized. An example of this would be that a problem someone is having can be described in a chat session, but the session is basically free form so the requester is not aware of exactly what the other party needs in order to make the best decision about how to handle the problem or with what resources. Another problem with known presence based protocols is that a participant cannot easily control the mutual availability for a planned or pending conversation. The basic states are statically available or not presented to anyone following the presence of a participant. The participant cannot selectively become available for certain conversations but not others.

Still another problem with typical presence-based solutions is that there is no formal model for negotiating availability between two or more parties. For example, a participant might state in a chat session to one who is currently unavailable, "Can we talk in five minutes"? The person targeted by the request would be required to notice and read the message, to understand the request, and then reply to the request by manually typing a reply. This is not very convenient or efficient in a fast-paced communications environment.

Therefore, what is clearly needed is a system for electronic negotiation of mutual availability between two or more parties intending to communicate, such that the pending communications session is most convenient for all of the parties concerned.

SUMMARY OF THE INVENTION

The problem stated above is that formalization of and better control of negotiating for availability of two or more participants to engage in a communications session is desirable for a communications network, but many of the conventional means for negotiating availability between communications appliances, such as static indications of current presence-based availability status presented over an instant message channel are not flexible and leave fewer opportunities for user convenience or satisfaction. The inventors therefore considered functional components of a server-brokered communications network, looking for elements that exhibit interoperability that could be harnessed to provide availability negotiation between communications appliances, but in a manner that is most convenient for all parties to the pending communication.

Every successful communications network is marked by good quality of service and convenience of use, one by-product of which is an abundance of content consumers who may rely on that network for a variety of communications purposes including ecommerce. Most such communications networks employ servers and executable software to conduct the business of determining when a connection may be established and building the connection quickly and efficiently, and servers running software applications are typically a part of such apparatus.

The present inventor realized in an inventive moment that if, at the point of intent to communicate, availability of the other party relative to the availability of the requester could be better controlled, significant reduction in waste relative to communicating over a network might result. The inventor therefore constructed a unique system for negotiating mutual availability for two or more parties having intent to communicate, but constrained the parties to mutual availability within a specified time window. A significant improvement in control over availability negotiation between two or more communications appliances results, with no impediment to quality of service or ease of use created.

Accordingly, in an embodiment of the present invention, a network-connected server for meeting initiation is provided, comprising software executing on the server from a non-transitory physical medium, the software providing: a function allowing a user to schedule a meeting and to configure availability conditions, a function for informing scheduled participants of the scheduled meeting, a function for receiving indications of availability for the scheduled meeting from communication appliances associated with scheduled participants, and a function for connecting the communication appliances to communicate when the configured availability conditions are met.

In one embodiment a part of the configuration of a scheduled meeting is a threshold of number of scheduled participants being available to participate. Also in one embodiment there is a function for informing scheduled participants of availability of other scheduled participants. Further in one embodiment one communications appliance is a mobile telephone and another communications appliance is an interactive voice response (IVR) unit. In another embodiment one communications appliance is a personal computer and another communications appliance is a web server.

In one embodiment there is a function using geo-location of communications appliances relative to geo-location of an appliance associated with the user who schedules the meeting to prioritize a list of contacts on the user's appliance. Also in one embodiment, in addition to receiving indications of availability the server receives indication of applications running on the communications appliances associated with scheduled participants. Availability may be accomplished through a ping sequence or a text channel. In some cases certain expected geo-location positions and states of a party's mobile communications appliance are configured as conditions for availability of the party.

In another aspect of the invention a method for meeting planning and initiation is provided, comprising the steps of (a) scheduling a meeting, including participants, and configuring availability conditions for participants required to initiate the meeting at a network-connected server; (b) informing scheduled participants of the scheduled meeting by the server; (c) receiving indications of availability for the scheduled meeting from communication appliances associated with scheduled participants; and (d) connecting the communication appliances to communicate when the configured availability conditions are met.

In one embodiment, in step (a) a part of the configuration of a scheduled meeting is a threshold of number of scheduled participants being available to participate. Also in one embodiment, in step (b) scheduled participants are informed of availability of other scheduled participants. Still in one embodiment one communications appliance is a mobile telephone and another communications appliance is an interactive voice response (IVR) unit, and in another embodiment one communications appliance is a personal computer and another communications appliance is a web server.

In some embodiments there is further a step for using geo-location of communications appliances relative to geo-location of an appliance associated with the user who schedules the meeting to prioritize a list of contacts on the user's appliance. Also in some embodiments, in addition to receiving indications of availability the server receives indication of applications running on the communications appliances associated with scheduled participants. Availability reporting may be accomplished through a ping sequence or a text channel. Further, states of a party's mobile communications appliance may be configured as conditions for availability of the party.

BRIEF DESCRIPTION OF THE DRAWING FIGURES

DETAILED DESCRIPTION

The inventors provide a system described below in several embodiments as a Meeting Arrangement Service (MAS) for dynamically negotiating mutual availability for two or more parties having intent to communicate, the communication to occur between two or more communications appliances over a network. The process enables dynamic availability coordination so that the time of the communication is suitable and hopefully best for all communicating parties. The present invention is described in enabling detail using the following examples, which may describe more than one embodiment falling within the scope of the present invention.

Figure 1:
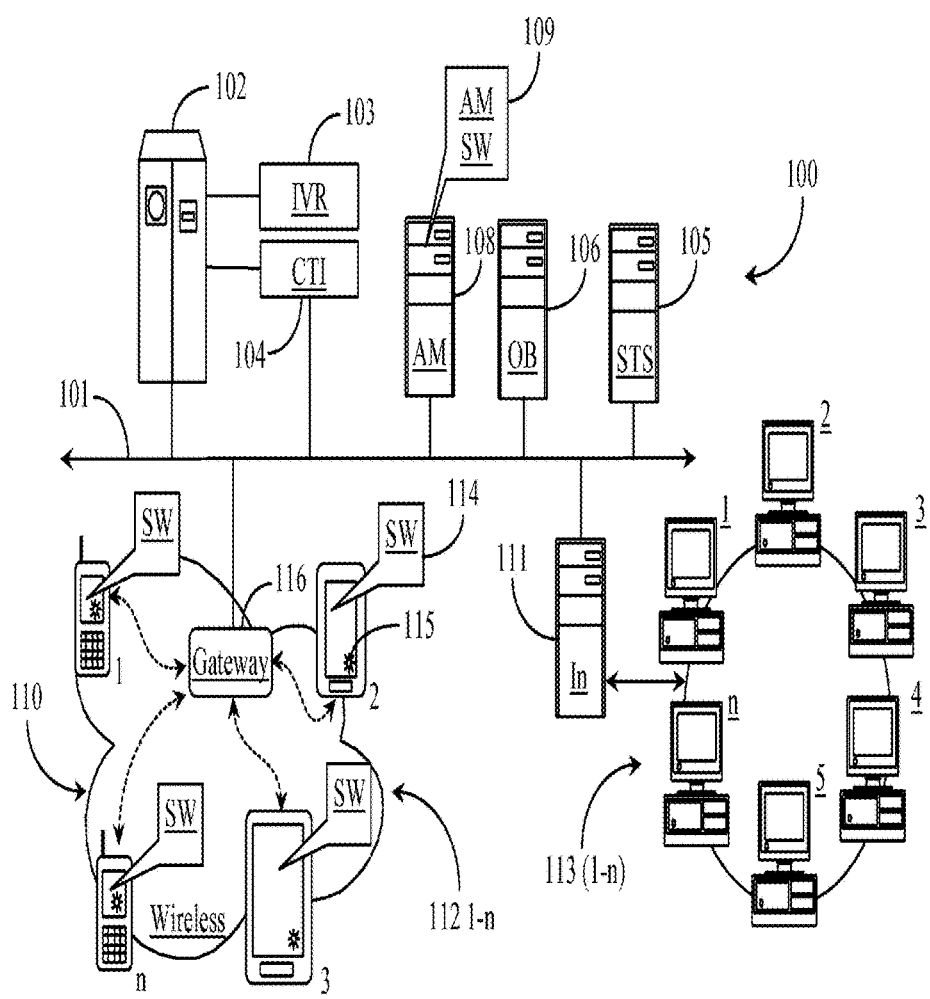
FIG. 1 is an architectural diagram of a communications network that supports dynamic availability negotiation between two or more communications devices.

FIG. 1 is an architectural diagram of a communications network 100 that supports a MAS providing availability negotiation between two or more communications devices according to an embodiment of the present invention. Communications network 100 in this example includes a call center supported by a local area network (LAN) 101. The call center comprises various pieces of equipment hosting software that are supported by LAN 101. LAN 101 supports a central telephony switch 102. Telephone switch 102 may be a private branch exchange (PBX) or other suitable hardware telephone switch. In one embodiment, telephone switch 102 is a switch implemented in software on a computing appliance.

Telephone switch 102 is enhanced for computer telephony integration (CTI) by a CTI processor 104 connected to LAN 101 and to telephone switch 102 via a CTI link. CTI processor 104 provides intelligent routing instruction and call processing control to switch 102. Switch 102 has connection to an interactive voice response (IVR) unit 103. Callers may access telephone switch 102 through any telephony carrier network, including digital carrier networks. Callers may also access switch 102 from the Internet network without departing from the spirit and scope of the present invention.

In this example, persons operating mobile communications appliances 112(1-n) may access call-center telephone switch 102 via a wireless carrier network 110, and a wireless media gateway 116 having connection to LAN 101. In actual practice and other embodiments, persons may access switch 102 through a telephony network such as the public switched telephone network (PSTN) not illustrated in this example to save space. Wireless network 110 represents any digital wireless telephony carrier network and access to both PSTN resources as well as data network resources such as Internet access.

LAN 101 in the call-center supports a statistics server 105. Statistics server 105 includes a non-transitory digital medium that contains all of the software and data required to function as a statistics server for a call center. Statistics server 105 can serve information that is typical of call center operation data such as estimated waiting time (EWT) in queue, average call handling time, and like statistics. LAN 101 also includes an outbound dialing server 106. Outbound dialing server 106 includes a non-transitory physical medium hosting all of the data and software to enable outbound dialing through telephony switch 102.

LAN 101 supports an interaction server 111. Interaction server 111 includes a non-transitory physical medium that hosts all of the data and software to enable function as an interaction server. Interaction server 111 is adapted to queue and serve interactions to individual ones of agents 113 (1-n) working in an agent group. In this example interactions means telephony events, but in other embodiments may mean any voice based or text based communication functionality. In this example each call center agent may be stationed at an agent workstation (each represented herein by a personal computer icon) including a personal computer and a PBX or other type of telephone or telephony application for enabling voice and possible video/voice communications, and in other embodiments text-based communication as well.

In typical call center interaction scenarios, potential customers call into the site from external networks using, in this example, mobile communications appliances, and are routed through the network to telephone switch 102 in the call center. An IVR 103 may respond to calls arriving at switch 102 and determines the intent of the call and the identification of the caller. Identification may also be ascertained by call data. Based on this information, a routing routine is typically used to place the call in an appropriate queue for later connection to an agent in the event that no live assistance is currently available. Callers may be informed by IVR 103 an approximate wait time for an agent. Callers may typically be on hold perhaps listening to music until their call is finally routed to a live agent.

In this example, an availability monitoring server 108 is provided. Availability monitoring server 108 includes a non-transitory physical medium containing all of the data and software required to enable function as a server capable of serving availability information. In this example, server 108 keeps track of activity of interaction server 111 and determines current availability status relative to agent group 113 (1-*n*) with the aid of an availability messaging application (AM/SW) 109. In general, there are two states of availability for a conversation, ready and not ready. These are typical presence-based states; however, agents may also have a predicted state of readiness in some embodiments. That is to say that for a particular agent, readiness to have a conversation may be predicted by taking into account average handling time and number of interactions in queue.

Application 109 is capable of sending availability messages to potential customers like operators of communications appliances 112 (1-*n*). In this example each communications appliance 112 (1-*n*) has a client SW application 114. SW 114 includes capability of receiving and sending AM state messages. SW 114 is also able to initiate a connection automatically with another communications appliance or system adapted with SW to participate. In one embodiment the communication sessions are accomplished using session initiation protocol (SIP). The present invention can be practiced in various call center embodiments whether they are inbound or outbound with proactive contact.

In one embodiment a communications appliance like one of 112 (1-*n*) is used to make initial contact with the call center. When the call reaches switch 102 IVR 103 intercepts the call to determine caller intent and routing. The caller may, instead of waiting to be routed to an available agent, be queued in a virtual queue. The caller may hang up but remain available to the network meaning the communications appliance is switched on and accessible over the network. The caller may have preferred periods of availability based on a personal schedule. The caller may also have preferred periods of availability tied in to geo-location and schedule. These configurations of availability in this example are a part of data available to SW 114 executing on the communications appliance. The constant desired status for agent availability in this example is "ready" for a conversation. However, due to incoming call load, none of the agents may be available at certain peak periods.

Availability monitor SW 109 running on server 108 may send availability messages to certain callers when one of agents 113 (1-*n*) is ready for a conversation. A communications appliance that receives a "ready" message may with appropriate indication to the caller, initiate a connection directly to the agent that is reported to be ready for a conversation. The caller may also elect to send availability messages to the call center periodically. Server 108 running availability monitor software 109 may take into account that certain callers have availability preferences tied to schedule or to geo-location. When a communications appliance sends a "ready" message, the call center may attempt to call the appliance if an agent is also ready for a conversation at that time. The call center makes an attempt to connect only when both conversation parties are "ready" to have a conversation. Availability monitoring server 108 may subscribe to statistics server 105 to receive statistics that may help to predict future readiness of an agent to have a conversation.

In a preferred embodiment, there are two modes, manual and automatic, for initiating a connection (conversation) between two or more communications appliances like 112 (1-*n*). In manual mode, the caller receives an availability monitor message of "ready" for a conversation. Ready for conversation implies that there is no wait time in queue and that the caller will be connected to an agent if the pending connection is manually accepted. The caller manually accepts the pending connection by pressing a designated button or adapted touch screen icon associated as an input with SW 114. The caller may manually select an option to connect, which will initiate a call either directly to the ready agent, or in such manner that the queue may be bypassed so the caller is immediately connected. IVR 103 may be adapted to recognize such connection attempts that follow a ready message so that the caller is understood to have a "reservation" for a ready agent as a result of the caller action of "accepting" a ready message.

In automatic mode, the communications appliance may receive a "ready message" and may automatically initiate a connection with an appropriate alert so the caller should know what the appliance is doing. An indication 115 of the receipt of a "ready" message may be provided as a flashing icon with an audio tone. The caller may have one or more availability constraints tied to personal schedule or geo-location [GPS] feature. For example, if the caller is in automatic mode and current geo-location places the caller at a location to which the caller may not converse using the communications appliance, the auto-connect feature may be overridden. Manual mode allows the caller to accept or reject a pending connection. In virtual queue situation where more than one caller may be waiting for an agent to be ready, the order of callers in the virtual queue is taken into account as well as which of those callers have reported or otherwise have the state of "not ready". Therefore, a caller in front of the queue may be passed over for another caller if the former is "not ready" and the other caller in the queue is "ready" for the pending connection.

This particular example illustrates a call center embodiment that includes a sophisticated virtual queuing system. In another embodiment, the invention may be practiced by more than two parties such as several parties to a conference bridge, for example. A pending conference call may be initiated if all parties or a pre-programmed portion of all parties report a readiness to participate in the call. In this case, ready messages may be reported periodically from the participating appliances and when some threshold is reached in the number of parties reporting ready, the conference may be initiated automatically, and each party invited to the conference may automatically connect to the bridge with appropriate indication to the caller.

In one embodiment the present invention is practiced in a peer-to-peer mode between two communications appliances one or both of whose operators desire a conversation when both parties are suitably "ready" to have the conversation. In this case, the parties through their respective communications appliances via a version of SW 114 may send and receive availability messages and negotiate connection to occur at a mutually beneficial time. In general, when both parties are suitably available, the connection may be automatically or manually initiated from either side.

Figure 2:
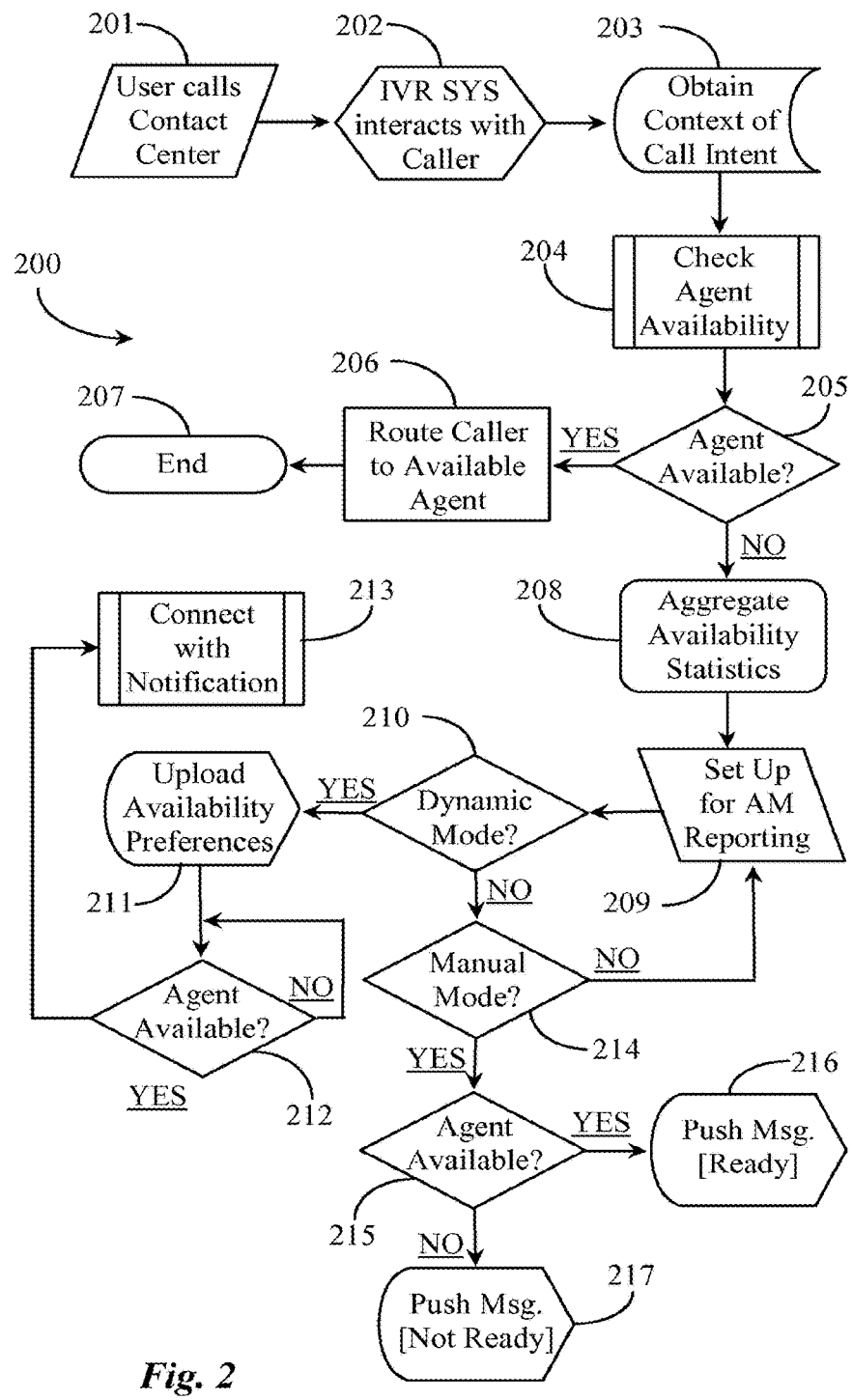
FIG. 2 is a process flow chart illustrating steps for reporting availability of call center agents according to an embodiment of the present invention.

FIG. 2 is a process flow chart 200 illustrating steps for reporting availability of call center agents according to a variation of the embodiment of FIG. 1. It is assumed in this example that the user is a participant in the present invention and has an instance of SW 114 running on the communications appliance used to initiate the pending conversation.

At step 201 the user calls a contact center adapted to practice the invention. At step 202, an IVR system intercepts the call and interacts with the caller. At step 203 the IVR obtains the context of the call and caller intent. In one embodiment, the invention is practiced when the caller requires live assistance and there are currently no available agents on hand at the time of the call. As a part of agent level routing, the system checks agent availability for call routing at step 204. At step 205 the system determines if there is a ready agent to take the call. If an agent is readily available at step 205, then the caller is routed to the available agent at step 206. The process ends for that caller at step 207 because there was an agent available to take the call.

If it is determined that there is no available agent at step 205, then at step 208 the availability monitor may aggregate availability data. The IVR may prompt the caller to set up for availability reporting at step 209. Availability monitoring may be practiced by the call center in general on behalf of any agent or group of agents. Here the caller has two choices available. At step 210 the caller may decide to set dynamic mode or automatic mode. If the caller decides to use dynamic mode at step 210, the communications appliance used by the caller uploads any availability preferences to an availability monitoring server at step 211. An availability preference may be tied to current caller schedule or to a geo-location [GPS] state, or both.

After the user uploads availability preferences at step 211, the user may then disconnect from the call center telephone number. This step is not illustrated but may be assumed. Likewise, the user is placed in a virtual queue so that queue position may be a factor in availability reporting. The queue may have a certain time-out period if mutual availability negotiation between the user and the call center does not result in initiation of a conversation within a certain period of time. The availability messaging component of the monitor application sends periodic availability messages to the communications appliance of the user. In the event that no agent is available at step 212, the message sent to the user reads "not ready" and the process loops back to the reporting step.

Periodic reporting may occur every few minutes or less frequently if warranted such as at high peak periods with high estimated waiting time. Availability reporting may also be subject to availability preferences of the user uploaded at step 212. For example, if the user has a "not available setting" tied to one or more geo-locations [GPS states], the communications appliance may report or send an availability message of "not ready" whenever the GPS state exists on the mobile phone. In this example, the user is not sending availability messages to the availability monitoring server, but may be set to send availability messages if so desired. Availability preferences may also include explicit statements such as "I am not available between time A and time B".

At step 212, if the system determines availability of a suitable agent for handling the call, the availability monitoring sever, using a messaging component, sends an availability message of "ready for conversation" or something to that effect to the user's communications appliance. In dynamic mode, as soon as the appliance receives the message, it may automatically initiate a connection to the call center, more specifically, to the available agent at step 213. It is noted herein that this is not an outbound scenario as the call center is not calling the user back. Rather, the user is automatically retrying the original call when mutual availability is successfully negotiated. Therefore, after receiving an availability message of "ready", the user's communications appliance begins initiating the connection with the appropriate notification to the user.

In one embodiment, a flag or cookie system may be in place to enable the call center system to recognize that the new call is the result of a sent message of readiness to converse on behalf of an available agent. The user may still be in virtual queue at the time of the connect attempt of step 213. An audible sound along with a visual indication may occur on the communications appliance while the attempt is made so the user may notice this and participate in the call. In one embodiment, an availability monitoring message of "ready" may include a direct number to dial or a link to activate during the automated connection attempt.

At step 210, the user may decide not to set connection initialization settings to dynamic or auto-mode. The process then moves to step 214 and the user may determine to set the initialization settings to manual mode. If the user determines not to set availability reporting to manual mode at step 214, then the process may resolve back to step 209 implying that the user should employ one of the two modes to be successfully connected when a ready message is received at the communications appliance operated by the user.

If the user determines to set initialization settings to manual mode at step 214, the user may then disconnect from the call center and rely on availability messages received from the call center to be notified of an agent who is ready to have a conversation. In this case, the user will decide manually whether or not to initiate contact with a "ready" agent. The availability monitor may push messages to the user regarding availability of the agent. If there is an agent available at step 215, the server sends a message to the communications appliance that an agent is "ready" to converse at step 216. If at a reporting interval, an agent is not available, then the server sends a "not ready" message at step 217. In the case that the user receives a "ready" message, the user may manually decide to initiate a connection with the ready agent.

In one embodiment, a flag or cookie system may be in place to enable the call center system to recognize that the new call is the result of a sent message of readiness to converse on behalf of an available agent. The user may be placed in virtual queue at the time of the original call and may still have a place in queue at the time of a manual connection attempt as a result of a "ready message". A timeout may be imposed in the queue to prevent the system from representing users who are unavailable or have repeatedly refused to connect in manual mode upon receiving a ready message.

Figure 3:
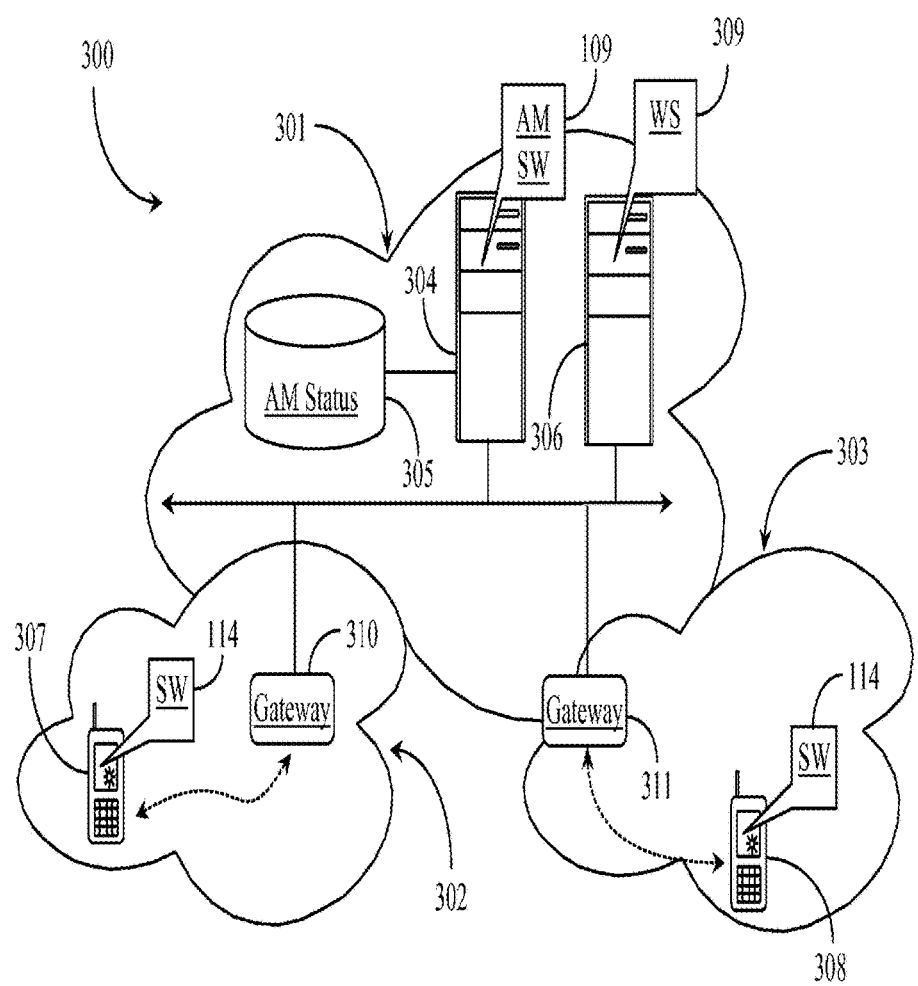
FIG. 3 is an architectural diagram of a communications network supporting dynamic availability negotiation according to an embodiment of the present invention.

FIG. 3 is an architectural diagram of a communications network 300 supporting availability negotiation according to another embodiment of the invention. Communications network 300 includes an Internet network 301. Internet network 301 supports a Web server 306. Web server 306 includes a non-transitory physical medium that contains all of the software and data required to enable server function as a Web server. Web server 306 hosts a Web page 309. Web page 309 may be a site where users may register with an availability negotiation service and wherein those users may download client application 114.

An availability monitor server 304 is provided and supported in Internet network 301. Server 304 includes a non-transitory physical medium that contains all of the software and data required to operate as an availability monitoring message server. Availability monitoring software 109 includes a capability of monitoring availability status of communications appliances registered with the service. A mass repository 305 is provided and is adapted to contain current availability status of registered appliances that are connected to the network.

Communications network 300 includes a wireless carrier network 302 and a wireless carrier network 303. Networks 302 and 303 may be segments of a same carrier network, or they may be separate carrier networks. A communications appliance 307 is illustrated in this example and has an instance of SW 114 executing thereon. Communications appliance 307 may be a cellular telephone, a smart phone, an iPad, a laptop, or some other communications appliance capable of a mobile wireless connection. In one embodiment, the invention may also be practiced to some extent using land-line connected communications appliances. In this example, communications appliance 307 connects to Internet 301 through a media gateway 310.

A communications appliance 308 is illustrated in network 303 and is also executing client software 114. Communications appliance 308 connects to Internet 301 through media gateway 311. It will be appreciated that different modes of Internet connection may be practiced without departing from the spirit and scope of the present invention. In this example, the users operating appliances 307 and 308 have an "intent" to have a conversation with one another using the registered appliances. SW 114 includes an availability reporting component and an availability requesting component. Communications appliances 307 and 308 are connected to server 304 when sending and receiving availability messages. Availability status reporting and availability negotiation is brokered by server 304 on behalf of the users operating the appliances.

While connected to server 304, appliances 307 and 308 may send availability messages to one another. Availability messaging may use instant messaging, chat, simple message service (SMS), multimedia message service (MMS), or a real simple syndicate (RSS) feed to convey availability information about the other party to each user. In one embodiment, each communications appliance includes a contact list of users that illustrates connectivity state for receiving and sending availability messages for each user. A user may then open a contact application and see present information such as "connected" or "not connected" for availability messaging.

Assume now that the user operating appliance 307 from network segment 302 wishes to have a conversation with a user operating appliance 308 from network segment 303. The user operating appliance 307 while connected to server 304 may open a contact application aided by SW 114 and see if the other party operating appliance 308 has connection to server 304. If so, the parties may report availability states to one another. In this case, the messaging is brokered through server 304. The messaging process may consider one or more rules relative to "availability to have a conversation" into account. Rules may involve GPS coordinates such as "not available" if at the following GPS location(s), or explicit constraints such as "not available" between 12:00 PM and 2:00 PM Monday through Friday. SW 114 may include integration with other applications such as navigator applications and calendars or scheduling applications.

The user operating appliance 307 may connect to server 304 and upload availability preferences if any are desired. An availability preference simply provides some constraint on initiating a conversation with another party. Both parties may have availability constraints configured in an "intent to communicate" scenario. The user operating appliance 307 may desire to communicate with the user operating appliance 308 and may request availability reporting from the user operating appliance 308. As a convenience, the user may also elect to send availability messages to the other party.

User 307 may set actions related to availability reporting. If desired, the user operating appliance 307 may set a dynamic connection attempt in the event of the first report indicating that the user operating appliance 308 is "ready" to have the conversation. In this scenario, appliance 307 periodically receives availability state of appliance 308 from server 304. When a "ready" message is received at the first opportunity, appliance 307 will automatically call appliance 308 unless the availability status of appliance 307 is "not ready". If appliance 307 receives a "ready" message from server 304 on behalf of appliance 308, but at the time a constraint is in place indicating a not ready status, the appliance will wait until a next "ready" message is received from the server. By the same token, availability status messages are sent to appliance 308 from server 304 indicating ready or not ready for a conversation.

Some optimization occurs in server 304 regarding availability messaging. For example, if a constraint exists on appliance 307 for a period of time, server 304 may decline sending any availability messages to appliance 307 during the lifetime of the current constraint. Likewise, the constraint may be reported in an availability message to appliance 308 as "not ready" followed by an indication of an end time for the constraint. In this way, server 304 can streamline messaging accordingly. However, in some embodiments manual settings may enable an override of a local constraint. For example, if the user operating appliance 307 has a "not ready" constraint in place, but receives a "ready" message from appliance 308, the user may connect to appliance 308 manually overriding the constraint. The user operating appliance 308 may have one or more constraints to availability as well. In this way, mutual agreement is forged between the appliances relative to a more opportune time for both users to communicate.

The present invention is applicable to different call modes like conference calling, for example. In conference mode, each party may report availability including uploaded geo-location, schedule constraints, and preferences wherein the conference is initiated by a conference bridge (party always available) when all of or at least a certain number of the parties indicate availability in messaging to the brokering server, in which case the conference bridge could be enabled to message the "join" instructions and start time to all of the parties having an "intent" to communicate.

In one embodiment, a user operating a registered appliance may request availability reporting from any contact connected to the server to send or receive availability messaging. In one embodiment, a contact list of users on a registered communications appliance is optimized by GPS proximity such that the contacts are listed in priority order according to proximity as indicated by GPS coordinates. In this application, closest contacts are listed first in the contact list. In one embodiment, these contacts are prioritized according to overall availability rating over time. In this scenario, a contact that shows an 80% overall availability rating might be listed before a contact showing 60% overall availability over the same period.

Figure 4:
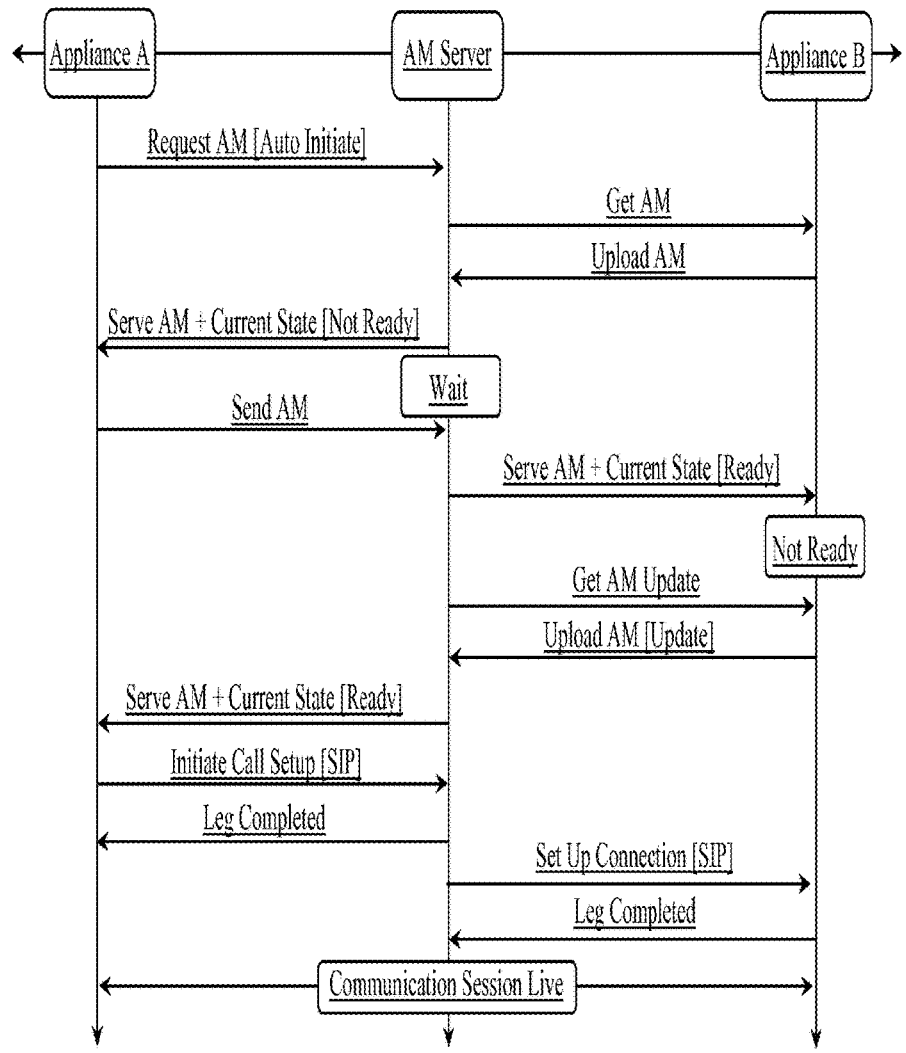
FIG. 4 is an interaction chart illustrating a process for brokering communication between two communications appliances according to an embodiment of the present invention.

FIG. 4 is an interaction chart 400 illustrating a process for brokering communication between two communications appliances according to an embodiment of the present invention. In the previous example there are two communications appliances and the messaging server. Interaction chart 400 provides a description of a possible interaction scenario between a communications appliance A, an availability monitoring server, and a communications appliance B.

A user operating appliance A may send a request to the server for availability reporting for communications appliance B, which is connected to the server and which is a contact of communications appliance A. In this step the user operating appliance A may elect to auto-initiate a connection upon receipt of a ready message from the server indicative that appliance B is ready for a conversation. The server may send a request to get availability from communications appliance B. Communications appliance B may upload availability monitoring information to the server. This information may include schedule dependant, geo-location dependent and explicit availability information.

The server sends an availability message on behalf of communications appliance B to communications appliance A wherein the current state is [Not Ready]. Upon receiving the message that appliance B is not ready, the local software does not initiate a connection and waits. Communications appliance A sends availability status to the server. The server then sends a message to communications appliance B that communications appliance A is ready to have a conversation. However, at the time of receipt of the message, communications appliance B is not ready to have a conversation.

The server sends a message to retrieve another availability monitoring update from communications appliance B. In response, communications appliance B uploads an update to the server. The server then sends a message to communications appliance A that indicates that communications appliance B is ready to have a conversation. Communications appliance A then initiates a call setup using SIP in this example. In this case, the availability monitoring server is SIP enabled and completes one call leg between communications appliance A and the server. The server then requests a call setup with communications appliance B and the second half of the call is established. Both appliances are then connected in a communication session. It is not required that the server broker the call setup process in order to practice the present invention. In one embodiment, communications appliance A simply auto-dials the telephone number of communications appliance B.

In one embodiment of the present invention, the service brokers the voice and video communications as well as the availability reporting between appliances. In another embodiment the appliance connects over a voice/video channel directly using standard protocols for such communications. In one embodiment a pinging process may be used to determine availability, however, an availability message may contain added data of importance to the pending conversation.

In a scenario where one party has intent to have a conversation with another party, the requesting party is charged with initiating the connection. In one embodiment one party may request and receive availability messaging on behalf of another party while that party send but does not receive availability information from the first party. In one embodiment, the context preceding all conversations is known to both parties before a conversation occurs. In one embodiment, additional contextual data is collected from one or more potential parties to a conversation in order to improve service related to that conversation. Context awareness simply indicates that a party knows beforehand what the session will be about before initiating a connection.

Figure 5:
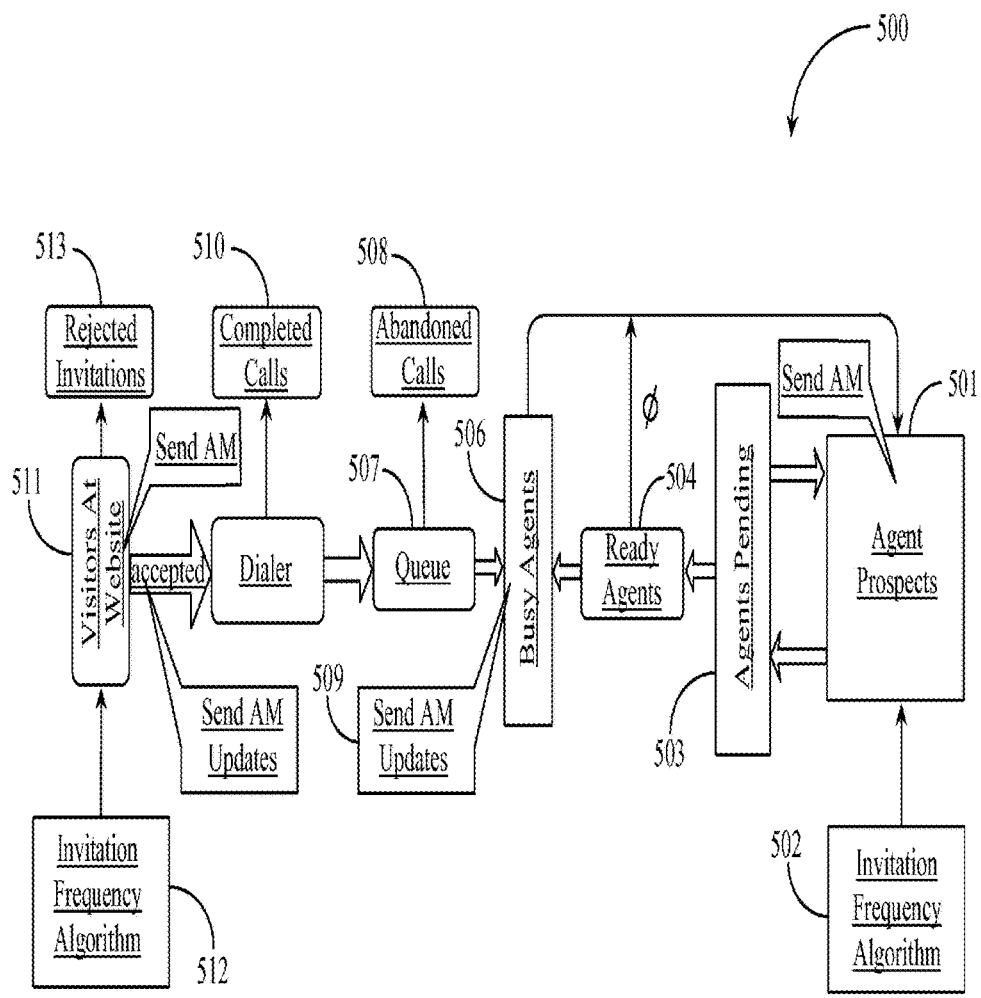
FIG. 5 is a block diagram illustrating call center invitation of potential customers including availability negotiation according to another embodiment of the present invention.

FIG. 5 is a block diagram 500 illustrating call center invitation of potential customers including availability negotiation according to another embodiment of the present invention. In one example in a contact center scenario for proactive contact, customers visiting the Website of an enterprise are invited to engage in a conversation. In this scenario, knowledge workers or agents may also be invited to take interactions based on availability.

A pool of agent prospects 501 serves as an acceptable pool of agents that may be individually invited to take an interaction. An agent pacing algorithm may govern the frequency at which invitations to take an interaction are sent. Agents who accept invitations to take an interaction may automatically send availability monitoring status or availability status to a third-party server. Agents who have accepted invitations become agents waiting on an interaction or a pool of pending agents 503. A pool of ready agents 504 include those agents who have accepted invitations and are "ready" to have a conversation. A timeout may be imposed on such agents so that if no interactions are forthcoming they may go back to other duties. Availability for invited agents is always "ready" to have a conversation unless a time out has occurred or unless they are one of a pool of busy agents 506 that are in the process conversing with potential customers.

As soon as agents engage a potential customer, the system or an availability monitoring server may send availability updates informing potential customers that they are "not ready" to have a conversation. The exact architecture depends in part on the queue structure and the number of agents that are actually "ready" for a conversation may fluctuate during peak and wan periods of call center traffic. However, invitation algorithm 502, also known to the inventors as a pacing algorithm for pacing the frequency of invitations that are sent to agents attempts to invite enough agents to engage customers that call center quality goals are still met at heavy traffic periods. Certain probability factors are considered such as the probable rate of refusal of agents to accept an invitation {depends on rules}. Other factors include the rate of traffic incoming into the call center, average handling time per transaction, and other factors.

In this example, potential customers are proactively culled from the Website as they are visiting. An invitation frequency algorithm 512 in provided for pacing the frequency at which invitations are sent to Website visitors 511. Like invitations to agents, invitations to Website visitors are paced to account for rejected invitations 513. Website visitors who accept invitations to engage in a conversation with an agent are considered "ready" to have a conversation in terms of availability status. As soon as visitors are engaged with an agent, however, their availability status changes from "ready" to "not ready" because of the current engagements.

In this example, a dialing function is provided for inbound dialing into the call center on behalf of the Website visitors. In one embodiment, an outbound dialing server is used to call the potential customers while they are at the Website. Completed calls 510 include all of those visitors who were immediately routed to available agents. Those customers who are not immediately connected to an agent are virtually queued in a queue 507. The customers in "queue" may disconnect from the call center IVR system and do not have to "hold" the line waiting for an available agent. Abandoned calls 508 include any visitors that originally accepted an invitation, but failed for one reason or another to complete a conversation. One reason for an abandoned call may be that a visitor has constraints placed on his or her availability and those constraints are not met within a certain time period allowed before a timeout occurs.

In this scenario pacing helps to provide enough agents to handle workflow and to provide enough customer traffic to keep agents busy in conversations or transactions. Agents do not have to be invited to take transactions in order to practice the present invention. Instead, a static number of agents may be set up as an agent pool or group to work incoming traffic. Availability status is monitored for both agents and Website visitors once they have accepted invitations to engage. Consequentially, when all agents are busy, potential customers receive "not ready" availability messaging for the call center. Those potential customers may automatically connect when a "ready" message is received. The invention may be practiced in automatic mode for automatic connection initiation, or it may be practiced in manual mode from the perspective of the potential customer.

In a call center environment, an availability status message of "ready" sent to a potential customer means that there is at least one agent who is currently "ready" to have a conversation. Automatic connection of the customer's communications appliance to the communications appliance used by the ready agent may be made while the potential customer has dropped off of the Website and is not on hold or currently waiting for an agent. The potential customer may still be in a "virtual queue" and messaging may be tailored to take into account queue position as well as other factors.

The pacing concept described above is designed to promote efficiency by sending invitations only to a number of Website visitors that can be serviced successfully by the agent pool given all of the factors and variables. Therefore, when there are no available agents to service potential customers from the Website, the algorithm send frequency drops dramatically but steadies. As more agents are available, the invitation frequency shifts upward and more Website visitors are recruited. It is noted herein that availability messages may be pushed to Website visitors and an availability status of "ready" may include a method for bypassing the front-end routing system such as ability for the communications appliance to dial directly to the "ready" agent bypassing IVR interception and traditional routing regimens. In a preferred embodiment, conversations that are in progress are monitored for quality and statistical information like all other call center transactions.

In one embodiment, additional metadata or data about an agent may be provided within a "ready" message sent to a potential customer from an availability monitoring server. That data may be displayed for the potential customer to read before the customer connects to the agent. Likewise, the agent may have additional information about a customer sent in an availability message to the agent from the availability monitoring server. Negotiation between two communications appliances with constraints applied involves waiting to connect at such a time when it is indicated that both parties are "ready" to have a conversation.

For individual parties, there may be a scenario where a party is engaged in multiple conversation scenarios wherein some of those may take priority over others of those intent scenarios. For example, both contacts A, B, and C report ready for a conversation. Contact A may have priority because it was the first contact to send availability messaging that has not yet times out. A client application such as SW 114 described further above with reference to FIG. 1 may manage priorities with respect to incoming AM from multiple contacts.

In one embodiment, SW 114 could also adjust to the user's personal profile and preferences for both sending automatic AM updates or reacting on other parties' AM updates. This could include incorporation of personal context information such as scheduled appointments or location information. For example, there may be a rule stating "not ready" when at location "A" because location A is a bank. Or, "not ready" if I am at location B between 10 and 11 because I am attending a lecture. Or, "not ready" between 8 and 10 in the morning because I am commuting. Or, "not ready" when I am moving [GPS] because I am driving a car.

In one embodiment of the present invention, a user may set AM reporting for other parties by sending a special request. The length of time reporting continues depends on configuration settings. In one embodiment, a user may desire to talk with an individual whenever that individual should become available for a conversation. The requesting party may subscribe to and may receive AM updates indefinitely from another party such that whenever the that other party is connected to the network AM status of "ready" or "not ready" is propagated.

In another embodiment of the present invention, described briefly above as incorporating a concept of a threshold number of participants as available to start a meeting, there may be several other features. The MAS may keep track of expected attendees' actual (dynamically reported) availability (time and potentially also location) and arrange a meeting (either face-to-face or virtual or mixed, potentially also with dynamically selecting the location) with short notice as soon as a representative quorum of attendees will be available. When triggering such event within MAS the meeting initiator can configure (mandatory and optional) settings such as any one of, combination of, or all of:

list of invitees, including their "communication intention" contacts and their contacts for "real communication" (the latter applies to conference calls where not all invitees are attending face-to-face)

start and end time of the time interval during which the meeting shall be arranged duration of the meeting (obviously shorter than the time interval)

quorum definition confirmation settings (whether or not invitees have to confirm their attendance once the meeting will be scheduled)

meeting type: (a) conference call w/o geo-location; (b) face-to-face only; (c) mixed success criteria (for example cancellation if insufficient confirmation level)

number of attempts escalation policy (for example relaxing quorum settings depending on remaining time)

preferences (such as preferred meeting times or locations)

The meeting settings can be archived and reused for subsequent meetings. Additional security can be added in order to prevent intruders to silently join. This could apply to the conference call, but also to the "communication intention" phase. In this case the configuration of the meeting could be simplified by just asking all invitees to establish a "communication intention" context with MAS and to authenticate to MAS with a given meeting id and passcode.

MAS could work in a case of conflicting meetings. A person may have several (two or more) concurrent meetings with different priorities. He might be notified by MAS about current status of each of them thereby changing decision making of this participant. The status of a meeting could contain such characteristics as number of available participants, time till meeting expiration and others.

It will be apparent to one with skill in the art that the availability negotiation system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A method for managing communications between a plurality of electronic devices, the method comprising:
   detecting, by a processor, that a caller is disconnected from a current call;
   in response to detecting, by the processor, that the caller is disconnected from the current call, identifying, by the processor, availability information for the caller, the availability information identifying a condition for engaging in communication with the caller;
   monitoring, by the processor, availability of the caller, wherein the availability of the caller is based at least on the availability information;
   monitoring, by the processor, availability of a plurality of agents of a customer contact center;
   determining, by the processor, mutual availability of the caller and an agent of the plurality of agents based on monitoring the availability of the caller and the availability of the plurality of agents;
   transmitting, by the processor, in response to determining the mutual availability, a signal to a switch, the signal for establishing a communication session between a first electronic device associated with the caller and a second electronic device associated with the agent.

2. The method of claim 1, wherein the caller is disconnected from the current call in response to determining, by the processor, that no agents are available for handling the current call.

3. The method of claim 1, wherein the availability information includes a time window identified by the caller.

4. The method of claim 3, wherein the processor determines the caller is available for establishing the communication session within the time window identified by the caller.

5. The method of claim 1, wherein the availability information includes a geographic location identified by the caller.

6. The method of claim 5, wherein the processor determines the caller is unavailable within the geographic location identified by the caller.

7. The method of claim 5, further comprising:
   receiving, by the processor, a first geo-location identified by a global positioning system (GPS) for the first electronic device;
   determining, by the processor, that the first geo-location corresponds to the geographic location identified by the caller; and
   identifying the caller as unavailable in response to the determining.

8. The method of claim 1, wherein the determining of the availability of the agent includes receiving, by the processor, a message from the second electronic device indicative of availability of the agent.

9. The method of claim 1 further comprising:
   obtaining, by an automated system, information on an intent of the caller prior to the current call being disconnected, wherein the instructions further cause the processor to bypass the automated system in establishing the communication session between the first electronic device and the second electronic device.

10. A system for managing communications between a plurality of electronic devices, the system comprising:
    a switch configured establish a connection for enabling communication between electronic devices;
    a processor; and
    a memory, wherein the memory includes instructions that, when executed by the processor, cause the processor to:
    detect that a caller is disconnected from a current call;
    in response to detecting that the caller is disconnected from the current call, identify availability information for the caller, the availability information identifying a condition for engaging in communication with the caller;
    monitor availability of the caller, wherein the availability of the caller is based at least on the availability information;
    monitor availability of a plurality of agents of a customer contact center;
    determine mutual availability of the caller and an agent of the plurality of agents based on monitoring the availability of the caller and the availability of the plurality of agents;
    transmit, in response to determining the mutual availability, a signal to the switch, the signal for establishing a communication session between a first electronic device associated with the caller and a second electronic device associated with the agent.

11. The system of claim 10, wherein the caller is disconnected from the current call in response to determining that no agents are available for handling the current call.

12. The system of claim 11, wherein the availability information includes a time window identified by the caller.

13. The system of claim 12, wherein the instructions cause the processor to determine that the caller is available for establishing the communication session within the time window identified by the caller.

14. The system of claim 10, wherein the availability information includes a geographic location identified by the caller.

15. The system of claim 14, wherein the instructions cause the processor to determine that the caller is unavailable within the geographic location identified by the caller.

16. The system of claim 14, wherein the instructions further cause the processor to:
    receive a first geo-location identified by a global positioning system (GPS) for the first electronic device;
    determine that the first geo-location corresponds to the geographic location identified by the caller; and
    identify the caller as unavailable in response to the determining.

17. The system of claim 10, wherein the instructions that cause the processor to determine the availability of the agent include instructions that cause the processor to receive a message from the second electronic device indicative of availability of the agent.

18. The system of claim 10, wherein the instructions further cause the processor to:
    invoke an automated system for obtaining information on an intent of the caller prior to the current call being disconnected, wherein the instructions further cause the processor to bypass the automated system in establishing the communication session between the first electronic device and the second electronic device.

* * * * *